United States Patent [19]
Kawano

[11] Patent Number: 5,028,949
[45] Date of Patent: Jul. 2, 1991

[54] SINGLE-LENS REFLEX CAMERA PROVIDED WITH TRIANGULATION DISTANCE MEASURING DEVICE AND STROBE DEVICE

[75] Inventor: Kiyoshi Kawano, Rochester, N.Y.
[73] Assignee: Asahi Kogaku Kogyo Kabushiki Kaisha, Tokyo, Japan
[21] Appl. No.: 497,674
[22] Filed: Mar. 23, 1990
[30] Foreign Application Priority Data
  Mar. 27, 1989 [JP] Japan .................. 1-34635[U]
[51] Int. Cl.⁵ .................. G03B 13/36; G03B 15/05
[52] U.S. Cl. .................. 354/403; 354/408; 354/149.11
[58] Field of Search ............. 354/149.11, 145.1, 126, 354/402, 403, 187, 408

[56] References Cited
U.S. PATENT DOCUMENTS
4,847,647 7/1989 Ueda .................. 354/149.1

Primary Examiner—W. B. Perkey
Attorney, Agent, or Firm—Sandler, Greenblum & Bernstein

[57] ABSTRACT

In a single-lens reflex camera, a light flashing block, on which a plurality of elements required for a triangulation distance measurement and a strobe light element for radiating light are provided. The block is rotatable between an operation position at which the photographing operation is executed and a non-operating position at which the light flashing block is downwardly directed. In the operating position, the light flashing block faces an object to be photographed, and can be sufficiently spaced apart from an optical axis of the taking lens to prevent so-called red-eye phenomenon. Further, since the elements required for the distance measurement also can be spaced apart from the taking lens, light from the object is not blocked by the taking lens. Further, since the light flashing block is faced downwardly when the photographing operation is not executed, the camera main body can be made small in size.

12 Claims, 5 Drawing Sheets

SINGLE-LENS REFLEX CAMERA PROVIDED WITH TRIANGULATION DISTANCE MEASURING DEVICE AND STROBE DEVICE

BACKGROUND OF THE INVENTION

The present invention relates to a single-lens reflex camera provided with a strobe and a distance measuring device for measuring the distance to an object to be photographed based on the principle of triangulation. More particularly, a camera wherein position of a light flashing block, in which the strobe device and a distance measuring device are provided, is changed from an operating position, where a light transmitting element of the distance measuring device and the strobe light flashing unit are directed towards the object and a non-operating position where the light transmitting element and the strobe light flashing unit are faced downwardly.

In general, AF (Automatic Focusing) single-lens reflex cameras are provided with a TTL (Through the Lens) type distance measuring device. More specifically, the distance from the camera to an object to be photographed is measured by the light from the object passing through a taking lens, whether the distance is measured by a phase difference detection system or by a contrast detection system, and then a focusing lens is driven to be moved in accordance with the measured distance. In the single-lens reflex camera, since a focusing operation, for each of the different types of exchangeable lenses, ranging from a wide-angle lens to a tele-photo lens, must be performed in the same manner, it is necessary to perform the distance measuring by means of a TTL type device.

Recently, however, single fixed-lens type reflex cameras have become commercially available, since the performance of zoom lenses has been improved. These fixed-lens type cameras do not always necessitate the use of TTL type distance measuring devices, but can use distance measuring device based on the triangulation principle (a triangulation distance measuring device) widely used in compact cameras. The TTL system is limited in its distance measurement ability depending on the diameter of the aperture of the taking lens. I in particular, when a wide-angle lens is used, the limitations on TTL measurements are severe. On the other hand, triagulation distance measuring devices do not have such limits and thus are preferable. When an active type triangulation distance measuring device, which transmits infrared light for distance measurement, is used in a single-lens reflex camera including a large photographing lens, it is very possible that the distance measuring infrared light is blocked by the taking lens, and in particular there is a problem in that a lower distance measuring zone is blocked by a wide-angle lens. To avoid the occurrence of the above problem, a distance measuring infrared light transmitting unit must be spaced from the taking lens, which results in an increased size for the camera body. Further, a passive type triangulation distance measuring device, i.e., a pair of light receiving elements, each of which receives light from the object and the distance between the camera and the object is measured in accordance with the difference in phases of the received light, has the same problem in that light from the object is blocked by the taking lens in the same manner, when the pair of the light receiving elements are positioned in the vicinity of the taking lens.

Further, recent single-lens reflex cameras are generally of the type containing a strobe device, and when the strobe device has a light flashing unit positioned in the vicinity of a taking lens, a so-called red-eye phenomenon is caused. The problem of the red-eye phenomenon can be solved when the strobe light flashing unit is spaced from a taking lens, and thus various kinds of retractable type strobe devices are used. It is difficult, however, to provide adequate distance between the strobe light flashing unit and the taking lens sufficient to totally prevent the red-eye phenomenon in a conventional arrangement.

SUMMARY OF THE INVENTION

It is therefore an object of the invention to provide an improved single-lens reflex camera, wherein when a triangulation distance measuring device and a strobe device are provided with the single-lens reflex camera, distance measuring light or light from an object to be photographed is not blocked by a taking lens, and a strobe light flashing unit can be sufficiently spaced apart from a taking lens.

For this purpose, according to the present invention, a single-lens reflex camera having a distance meausring unit, for measuring a distance between the camera and an object to be photographed based upon the triangulation principle is provided. The camera includes at least a light receiving element for receiving light reflected from the object, and a distance measuring unit is arranged to be movable between an operating position wherein the element is opposed to the object and a non-operating position wherein the distance measuring unit is downwardly directed above the taking lens.

It is a further object of the present invention to provide a single-lens reflex camera, wherein various types of switches of the single-lens reflex camera can be effectively disposed on a taking lens side instead of a camera body side so that the size of the camera body can be made smaller.

DESCRIPTION OF THE ACCOMPANYING DRAWINGS

DESCRIPTION OF THE EMBODIMENTS

Figure 1:
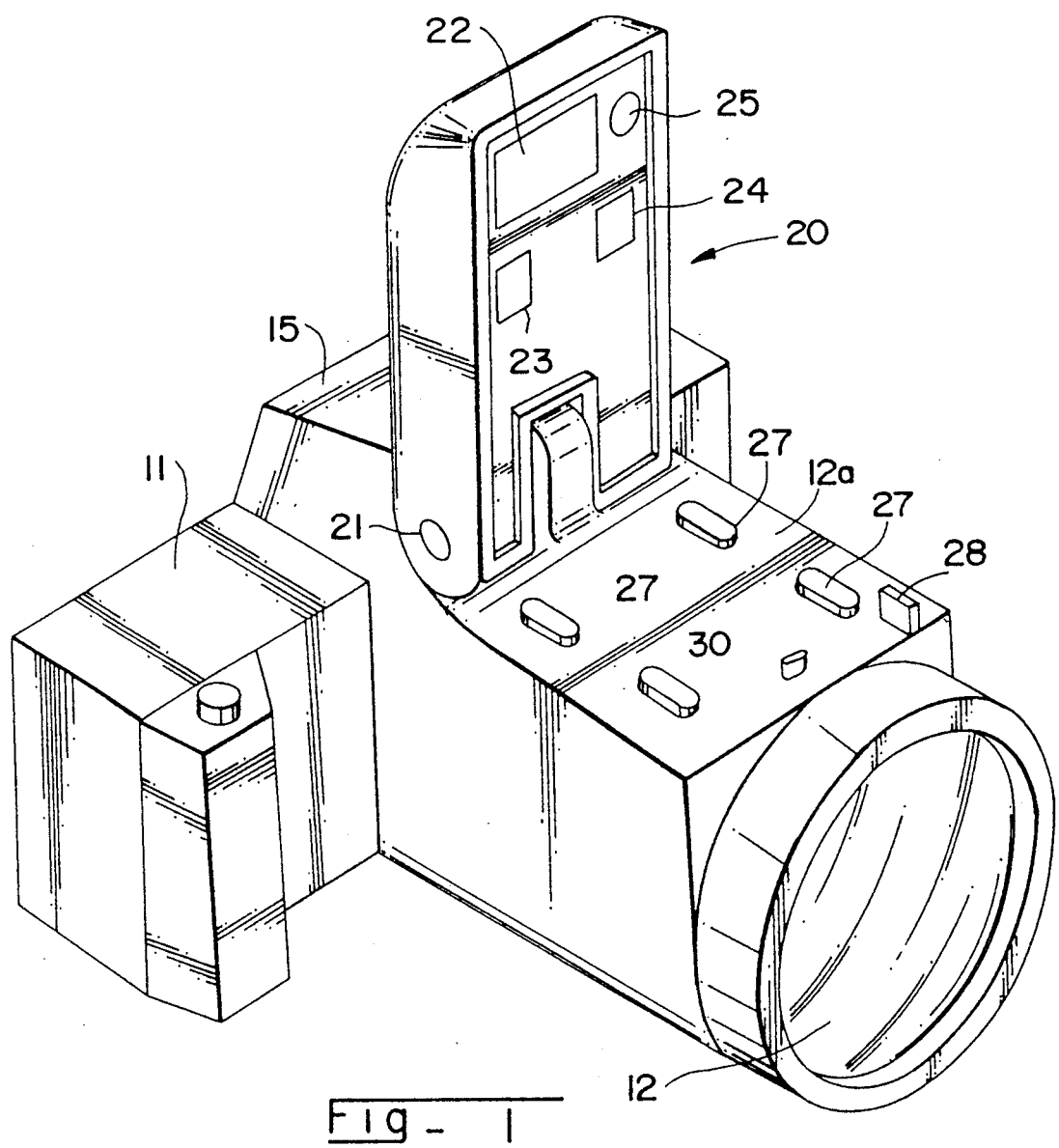
FIG. 1 is a perspective view of a single-lens reflex camera, wherein a light flashing block is located at an operating position.

Referring to the drawings, an embodiment of the present invention will now be described.

Figure 2:
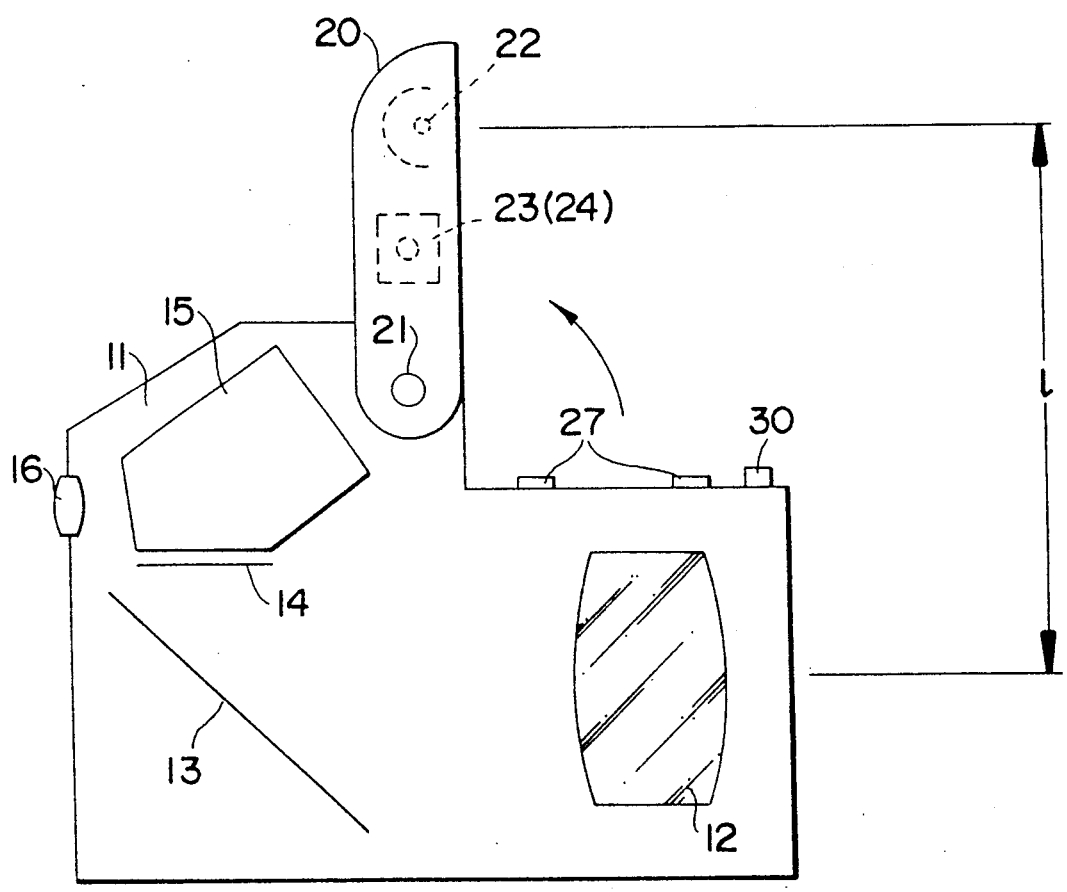
FIG. 2 is a side view of the single-lens reflex camera of FIG. 1.
Figure 3:
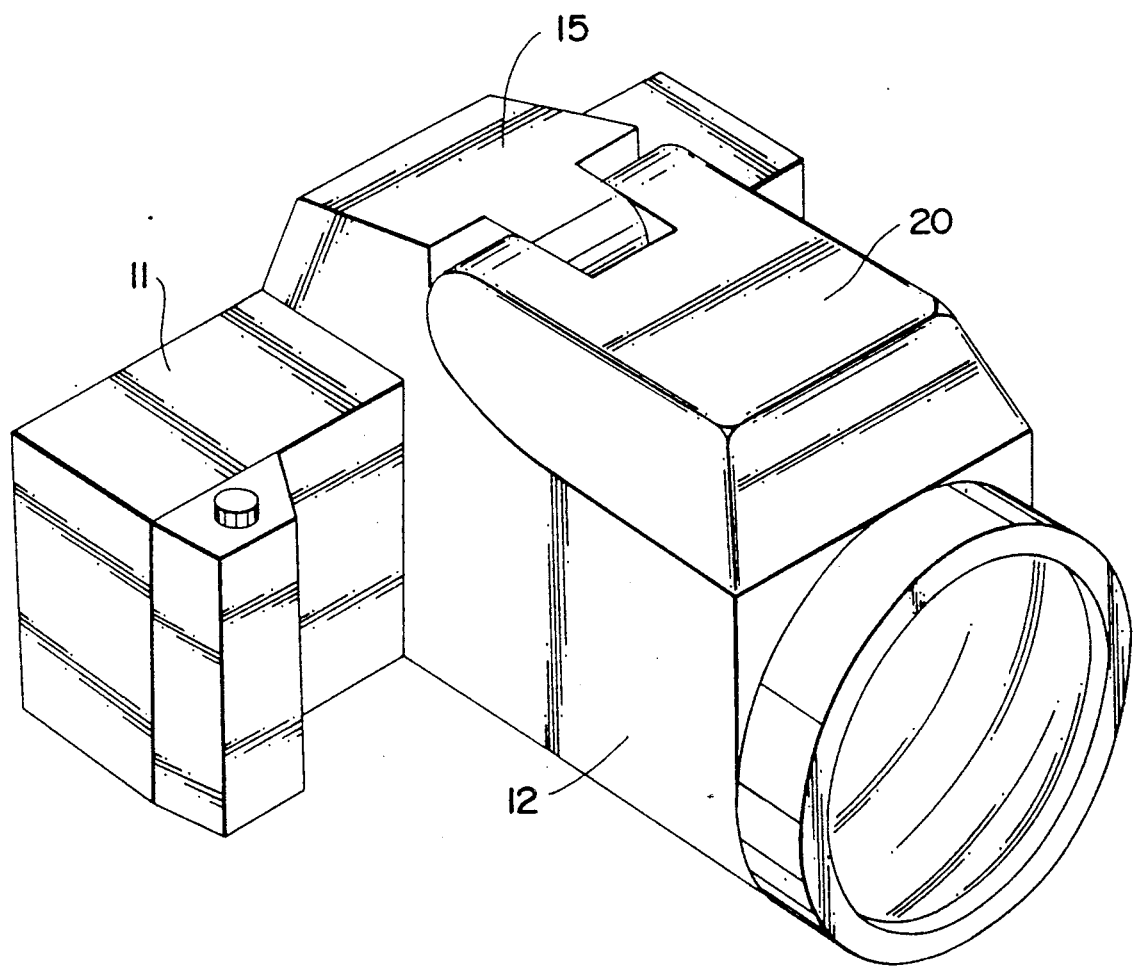
FIG. 3 is a perspective view of the single-lens reflex camera, wherein the light flashing block is located at an non-operation position.

FIGS. 1 through 3 show a first embodiment of the present invention, wherein FIGS. 1 and 2 show a light flashing block provided on a single-lens reflex camera according to the present invention located in the operating position and FIG. 3 shows the same in the non-operating position.

As illustrated in FIGS. 1 and 2, a single-lens reflex camera has a body 11 including a taking lens 12 fixed thereto. As known well, light passing through the taking lens 12 is usually introduced to a focusing plate 14 and a pentagonal prism 15 through a mirror 13, and observed by an operator through an eye lens 16. In a photographing operation, the mirror 13 is moved upwardly so that the light passing through the taking lens 12 is imaged on a film surface, i.e., an imaging surface.

The body 11 has a light flashing block 20 attached thereto by a lateral shaft 21 in front of the pentagonal prism 15. The light flashing block 20 is flatly shaped and arranged to be opposed to an object to be photographed when the photographing operation is performed. A surface at the top of the a barrel of the taking lens 12 is formed as a flat surface portion 12a corresponding to the surface of the light flashing block 20.

The light flashing block 20 is arranged to be rotated about the shaft 21 so that the position thereof is changed between an operating position in which the surface of the light flashing block is opposed to the object and a non-operating position in which the light flashing block 20 covers the flat surface portion 12a above the barrel of the taking lens 12, as illustrated in FIG. 2. The light flashing block 20 is provided with a strobe light flashing element 22, a pair of light transmitting and receiving elements 23, 24 ( or a pair of light receiving elements 23 and 24 when a passive type triangulation distance measuring device is employed) of a triangulation distance measuring device as well as an auxiliary light projecting unit 25. The strobe light flashing element 22 is disposed at a position spaced as far as possible from an optical axis of the taking lens 12 (distance : 1), and the light transmitting element 23 and the light receiving element 24 are respectively disposed at the lower portions of the strobe light flashing element 22. This arrangement is utilized so that the strobe light flashing element 22 can preferably be spaced as far as possible from the optical axis of the taking lens 12 to prevent red-eye phenomenon, whereas the light transmitting element 23 and the light receiving element 24 (or the pair of the light receiving elements 23 and 24) may thereby be arranged such that light to or from them is not optically blocked by the taking lens 12.

As known well, a auxiliary light transmitting element 25 irradiates a contrast pattern with, for example, infrared light, when an object is located in darkness, and thus is preferably employed when the passive type triangulation distance measuring device is used (in this case, when the light receiving elements 23 and 24 are used). Therefore, the auxiliary light transmitting element 25 is not necessary when an active type triangulation distance measuring device is used (in this case, when the light transmitting element 23 and the light receiving element 24 are used). The auxiliary light transmitting element 25 is disposed to the strobe light flashing element 22.

Various kinds of operation switches 27 of the camera, for example, shutter speed set, exposure value set, aperture value set and the like, are disposed on the flat surface portion 12a above the barrel of the taking lines 12. Further, a zooming switch 28 is disposed at the front right side of the taking lens 12. Also, a main switch 30, which is turned on and off depending on the position of the light flashing block 20, can be disposed on the flat surface portion 12a. That is, the main switch 30 is arranged to be depressed by means of the light flashing block 20, and the main switch 30 is turned off when it is depressed by the light flashing block 20 located at the non-operating position and turned on when the light flashing block 20 is turned to the operating position. In this case, as illustrated in FIG. 1, the operation switches 27 are arranged not to be depressed by means of the light flashing block 20.

Although the light flashing block 20 is of a turning type in the above described embodiment, it may also be detachably mounted to the body 11. When it is of the detachable type, electric connectors are respectively provided on the light flashing block 20 and on the body 11. In the detachable type, light flashing blocks 20 provided with the strobe light flashing elements 22 each having different guide numbers, the light flashing blocks 20 provided with the active type triangulation distance measuring device or the light flashing blocks 20 provided with the passive type triangulation distance measuring device and the like can be provided and selectively used.

Figure 4:
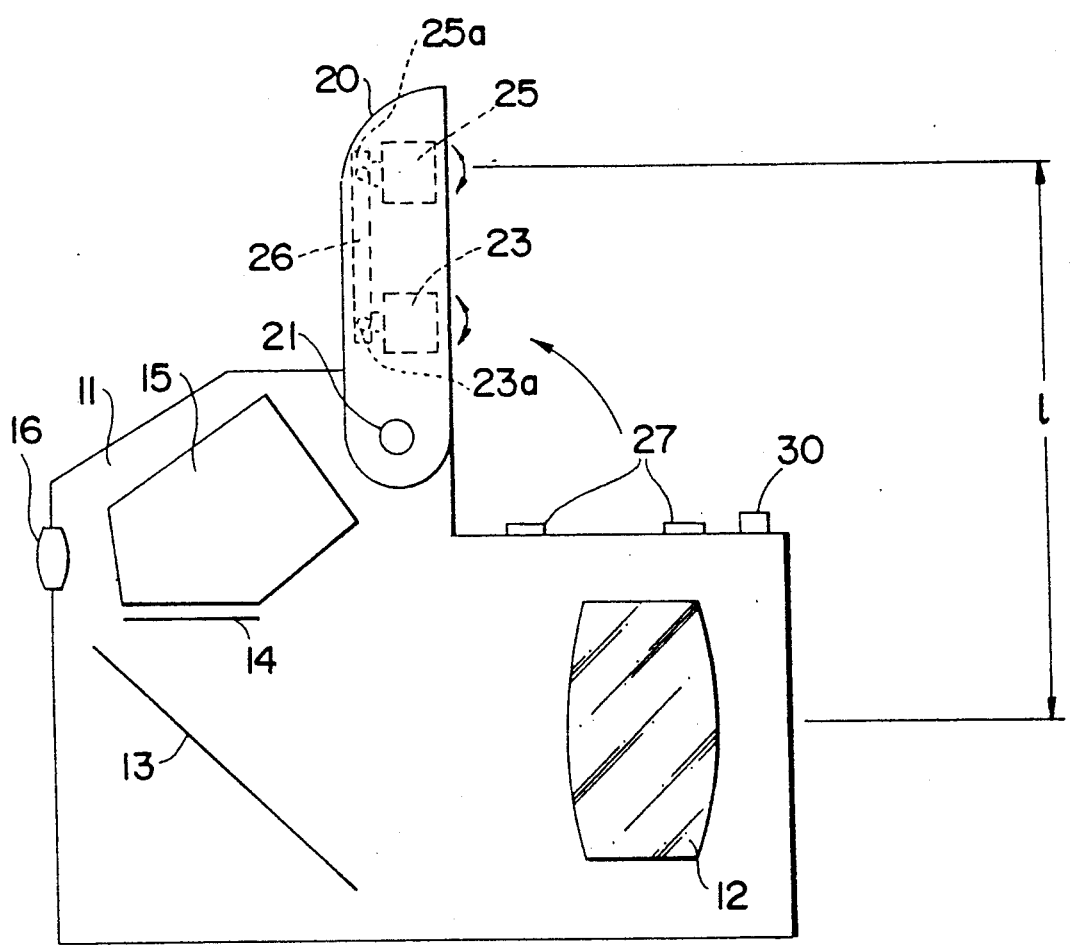
FIG. 4 is a side view of another embodiment according to the present invention.
Figure 5:
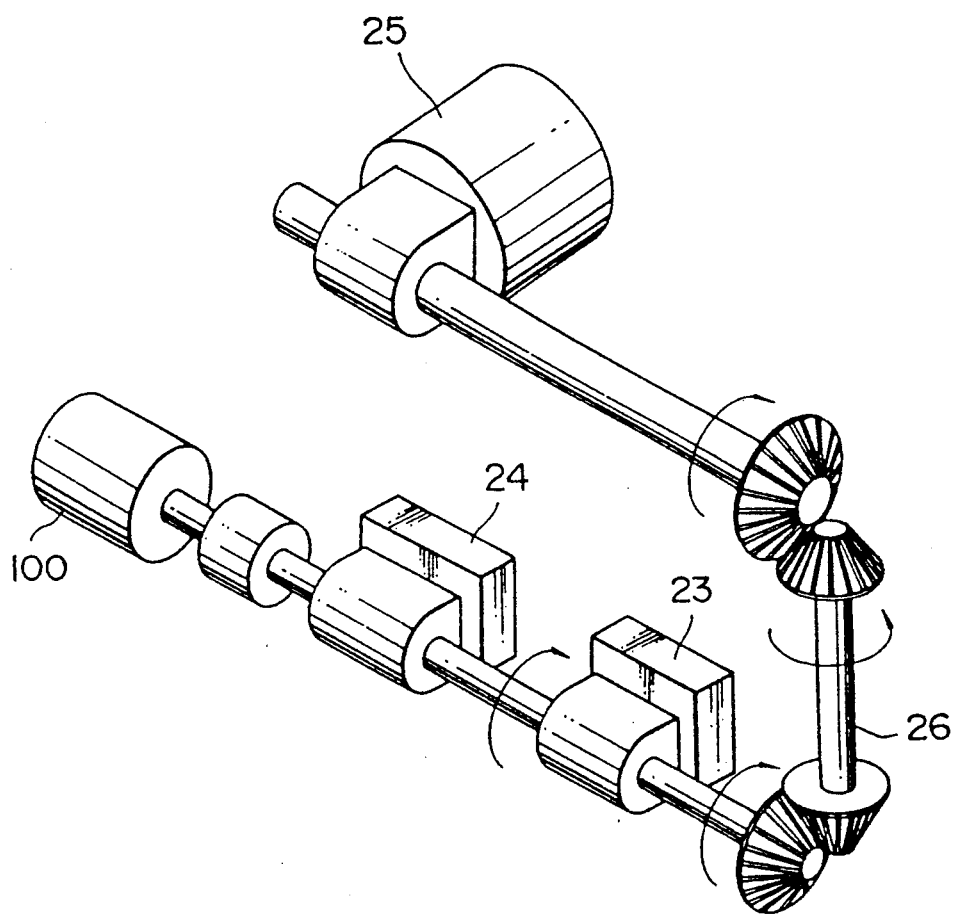
FIG. 5 a perspective view of one example of a connecting mechanism for connecting a distance measuring unit and an auxiliary light transmitting element.

FIG. 4 is a conceptual diagram of arrangement by which light transmitted from the auxiliary light transmitting element 25 and the pair of light receiving elements 23, 24 of the triangulation distance measuring device are scanned in association with each other. Both pair of light receiving elements 23, 24 and 25 can be rotated about the shafts 23a and 25a, in synchronism by a well-known connection mechanism 26. It may be considered that the connection mechanism 26 comprises a transmission mechanism driven by a motor 100, as illustrated in FIG. 5. Therefore, according to the embodiment, since the auxiliary light transmitting element can be synchronously moved with the pair of light receiving elements, the object to be photographed is scanned by the light radiated from the auxiliary light transmitting element. It may be further considered that the object is horizontally scanned through an arrangement illustrated in FIG. 4 or is so arranged that the object is vertically scanned.

What is claimed is:

1. A single-lens reflex camera having a taking lens and a distance measuring unit for measuring the distance between said camera and an object to be photographed based upon the triangulation principle, wherein said unit includes at least a light receiving element for receiving light reflected from the object, and wherein said distance measuring unit is arranged to be movable between an operating position wherein said distance measuring unit is opposed to the object and a nonoperating position wherein said distance measuring unit is directed downwardly above a taking lens.

2. The single-lens reflex camera according to claim 1, wherein said distance measuring unit is positioned in front of a pentagonal prism.

3. The single-lens reflex camera according to claim 2, wherein said distance measuring unit further includes a strobe light element for emitting light when a object is photographed.

4. The single-lens reflex camera according to claim 1, wherein said distance measuring unit further includes a light transmitting element for transmitting light having a predetermined wave length to an object.

5. The single-lens reflex camera according to claim 1, wherein said distance measuring unit further includes another light receiving element for receiving light reflected from the object, said light receiving element and said another light receiving element being spaced on said distance measuring unit by a predetermined interval.

6. The single-lens reflex camera according to claim 3, wherein said strobe light element is located further from said taking lens than said light receiving element when said distance measuring unit is located at said operating position.

7. The single-lens reflex camera according to claim 2, wherein a main switch of said camera is arranged to be turned on when said distance measuring unit is located at said operating position, while turned off when said distance measuring unit is located at said non-operating position.

8. The single-lens reflex camera according to claim 7, wherein said main switch is provided above said taking lens and depressed by means of said distance measuring unit when said distance measuring unit is located in said non-operating position.

9. The single-lens reflex camera according to claim 5, wherein said distance measuring unit further includes an auxiliary light transmitting element for transmitting a predetermined contrast pattern to an object.

10. The single-lens reflex camera according to claim 9, wherein said light receiving elements and said auxiliary light transmitting element are operated synchronously with each other.

11. A single-lens reflex camera having distance measuring unit which includes a pair of light receiving and transmitting elements for performing a distance measurement before an object is photographed based upon the triangulation principle, and a strobe light element for emitting light when an object is photographed, wherein said distance measuring unit is mounted to be movable between an operating position wherein said elements are facing an object and a non-operating position wherein said distance measuring unit is directed downwardly above a taking lens.

12. A single-lens reflex camera having distance measuring unit which includes a pair of light receiving elements for respectively receiving light reflected from an object to be photographed, said pair of light receiving elements being provided on said distance measuring unit at a predetermined spacing, and a strobe light element for emitting light when an object is photographed, wherein said distance measuring unit is mounted for movement between an operating position wherein said elements are facing the object and a non-operating position wherein said distance measuring unit is directed downwardly above a taking lens.

* * * * *